(12) United States Patent
Kikuchi

(10) Patent No.: US 12,228,401 B2
(45) Date of Patent: Feb. 18, 2025

(54) SURVEY SYSTEM

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 386 days.

(21) Appl. No.: 17/940,578

(22) Filed: Sep. 8, 2022

(65) Prior Publication Data
US 2023/0096054 A1    Mar. 30, 2023

(30) Foreign Application Priority Data
Sep. 24, 2021 (JP) ............................... 2021-155916

(51) Int. Cl.
| | |
|---|---|
| G01C 15/06 | (2006.01) |
| G01C 15/00 | (2006.01) |
| G01C 15/14 | (2006.01) |
| G02B 27/01 | (2006.01) |
| G06F 3/01  | (2006.01) |

(52) U.S. Cl.
CPC .......... G01C 15/06 (2013.01); G01C 15/002 (2013.01); G01C 15/14 (2013.01); G02B 27/0172 (2013.01); G06F 3/014 (2013.01)

(58) Field of Classification Search
CPC ...... G01C 15/06; G01C 15/002; G01C 15/14; G02B 27/0172; G06F 3/014
See application file for complete search history.

(56) References Cited

U.S. PATENT DOCUMENTS

| | | |
|---|---|---|
| 2003/0014212 A1 | 1/2003 | Ralston et al. |
| 2009/0244277 A1 | 10/2009 | Nagashima et al. |
| 2019/0063920 A1* | 2/2019 | Nishita ................. G01S 7/4817 |
| 2021/0080255 A1 | 3/2021 | Kikuchi |
| 2022/0283327 A1 | 9/2022 | Mueller et al. |

FOREIGN PATENT DOCUMENTS

| | | |
|---|---|---|
| EP | 3140710 | 3/2017 |
| JP | 2009-229350 A | 10/2009 |
| WO | 2020119912 | 6/2020 |

OTHER PUBLICATIONS

Related U.S. Appl. No. 17/940,558, filed Sep. 8, 2022.
Related U.S. Appl. No. 17/940,595, filed Sep. 8, 2022.

* cited by examiner

*Primary Examiner* — Georgia Y Epps
*Assistant Examiner* — Don J Williams
(74) *Attorney, Agent, or Firm* — Studebaker & Brackett PC

(57) ABSTRACT

A survey system is provided which includes a surveying instrument capable of performing distance and angle measurements of a target attached to a pole, a controller as a glove-shaped wearable device to be worn on a hand of a worker, and configured to transmit commands to the surveying instrument from an input unit for inputting commands, and an eyewear device capable of performing display superimposed on a landscape. Measurement points are displayed by being synchronized with and superimposed on a landscape of a survey site on the eyewear device, and by inputting a command by a worker from the glove-shaped controller that the worker wears into the surveying instrument while the worker grips the pole, distance and angle measurements of the target are made. Unnecessary turning of gaze and hand movements are omitted, and a survey work can be efficiently performed by the worker alone.

5 Claims, 18 Drawing Sheets

Palm side of hand

Back side of hand

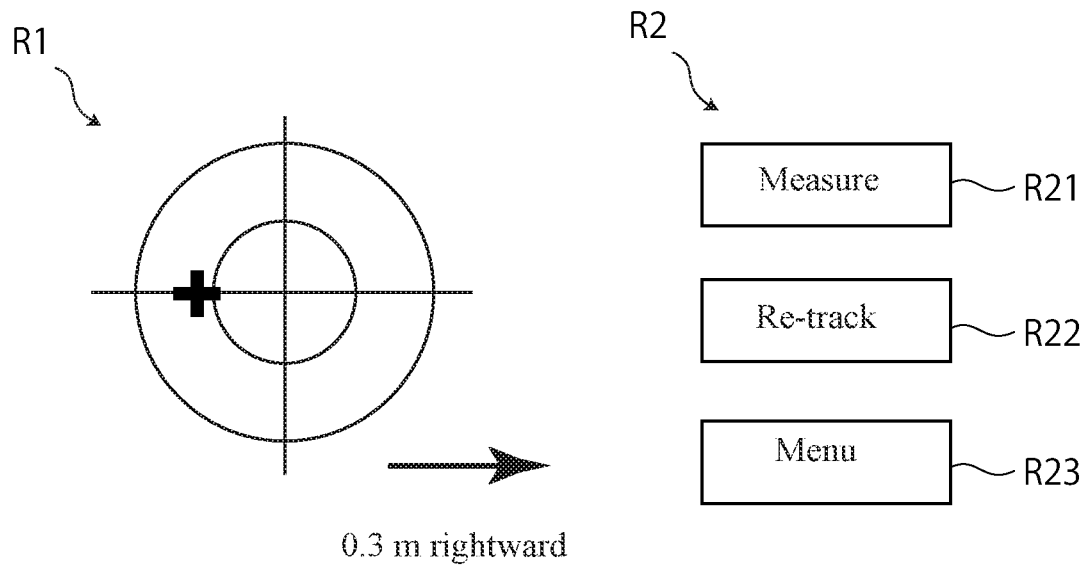
FIG. 13A
FIG. 13B
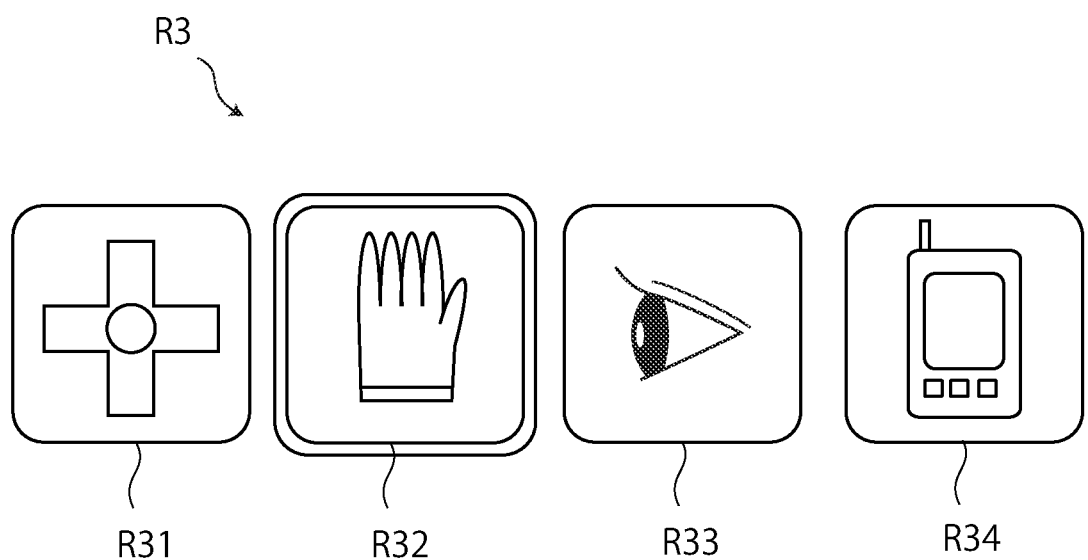
FIG. 13C

Palm side of hand

Back side of hand

Palm side of hand

Back side of hand

SURVEY SYSTEM

TECHNICAL FIELD

The present invention relates to a survey system that improves the work efficiency of a survey that is taken by a worker alone.

BACKGROUND ART

In recent years, there is an increasing number of cases where a worker takes a survey alone (one-man survey) (for example, Patent Literature 1). A worker can take a survey alone by carrying a device including a display unit and an input unit with him/her, moving to a measurement point while holding a pole with a target, confirming the measurement point with the display unit of the device, and remotely instructing a surveying instrument to make distance and angle measurements by the input unit.

CITATION LIST

Patent Literature

Patent Literature 1: Japanese Published Unexamined Patent Application No. 2009-229350

SUMMARY OF INVENTION

Technical Problem

However, this case has a problem in which a worker has to move while confirming the display unit of the device, and input a measurement command by the input unit to make measurements, so that a series of operations takes time.

The present invention was made to solve this problem, and provides a survey system that improves the work efficiency of a survey that is taken by a worker alone.

Solution to Problem

In order to solve the problem described above, according to an aspect of the present disclosure, a survey system is provided which includes a target, a pole to which the target is attached, a surveying instrument including a distance-measuring unit configured to measure a distance to the target, an angle-measuring unit configured to measure a vertical angle and a horizontal angle at which the distance-measuring unit faces, a driving unit configured to drive a vertical angle and a horizontal angle of the distance-measuring unit to set angles, a communication unit, and an arithmetic control unit configured to execute input commands, and capable of making distance and angle measurements of the target, a controller including a communication unit and an input unit for inputting commands, and configured to transmit commands to the surveying instrument by communicating with the surveying instrument, an eyewear device including a communication unit, a display, a relative position detection sensor configured to detect a position of the device, and a relative direction detection sensor configured to detect a direction of the device, a storage unit configured to store a measurement point at a survey site, and an arithmetic processing unit including a synchronous-measuring unit configured to receive information on a position and a direction of the eyewear device and synchronize the information with coordinates of the measurement point, wherein the controller is a glove to be worn on a hand and is provided with the input unit on a fingertip portion, and on the display, the measurement point calculated by the arithmetic processing unit is displayed so as to be superimposed on a landscape of the survey site, and distance and angle measurements by the surveying instrument are made according to a command input from the controller.

According to this aspect, with the eyewear device, a worker can confirm a measurement point superimposed on a landscape of a survey site, and further, with the controller that the worker wears as a glove, can send a command to the surveying instrument while keeping a posture in which the worker grips the pole. A worker can perform actions necessary for a survey without wasted motion, and the work efficiency of a survey by a worker alone is improved.

According to an aspect, the input unit is a sensor provided on at least a fingertip portion of the thumb of the glove to detect a contact, and configured to detect a contact direction, a movement direction of a contacted object, a contact strength, and a contact point, etc., and input a plurality of kinds of commands according to detection patterns. According to this aspect, only by motion of a worker's fingertip, a command can be input.

According to an aspect, the sensor is an electrostatic sensor or a pressure sensor.

According to an aspect, the surveying instrument includes a tracking unit configured to automatically track the target, and is configured so that the target is automatically tracked when the target is within a predetermined range from the measurement point, and position information of the target is displayed in real time on the display. According to this aspect, in a state where the target is locked on to, detailed position information is added, so that the pole can be installed at a measurement position with higher accuracy in a short time.

According to an aspect, the storage unit and the arithmetic processing unit are included in the surveying instrument. By including these software-wise or hardware-wise in the surveying instrument, components can be reduced. Settings can be made with the surveying instrument, so that the entire configuration can be simplified.

Advantageous Effects of Invention

As is clear from the above description, according to the present invention, a survey system that improves the work efficiency of a survey by a worker alone can be provided.

BRIEF DESCRIPTION OF DRAWINGS

FIGS. 13A, 13B, and 13C illustrate examples of images that a worker visually recognizes through the eyewear device.

DESCRIPTION OF EMBODIMENTS

Hereinafter, a detailed embodiment of a configuration of the present disclosure will be described with reference to the drawings. The embodiment is not intended to limit the invention but just an example, and all features described in the embodiment and combinations thereof are not always essential to the invention. Components having the same configuration are provided with the same reference signs, and overlapping description thereof will be omitted.

Embodiment

Figure 1:
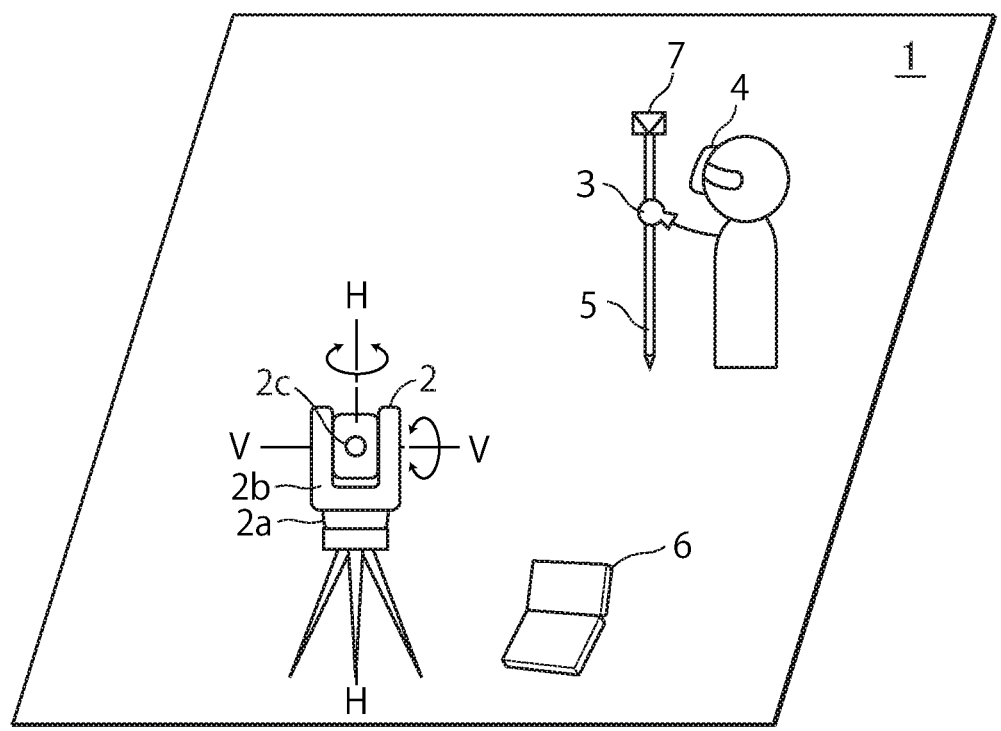
FIG. 1 is a schematic configuration diagram of a survey system according to an embodiment of the present invention.

FIG. 1 is an external perspective view of a survey system 1 according to a preferred embodiment of the present invention, and illustrates a work image at a survey site. The survey system 1 according to the present embodiment includes a pole 5 to which a target 7 is attached, a surveying instrument 2, a processing PC 6, an eyewear device 4, and a controller 3.

The surveying instrument 2 is installed on a reference point center by using a tripod. The surveying instrument 2 includes a base portion 2a provided on a leveling device, a bracket portion 2b that rotates on the base portion 2a horizontally around an axis H-H, and a telescope 2c that rotates vertically around an axis V-V at a center of the bracket portion 2b.

The eyewear device 4 is worn on the head of a worker. The controller 3 is worn on a hand of the worker. The processing PC 6 is installed at the survey site.

The pole 5 is used in a state where its lower end is installed substantially vertically on a measurement point. The target 7 is a surveying target of the surveying instrument 2, and has optical characteristics that retro-reflects light incident from all directions. The target is attached so that an optical center (optical reflection point) of the target 7 is set on a central axis of the pole 5, and an attaching height (distance from the lower end of the pole 5 to the optical center) is known.

Figure 2:
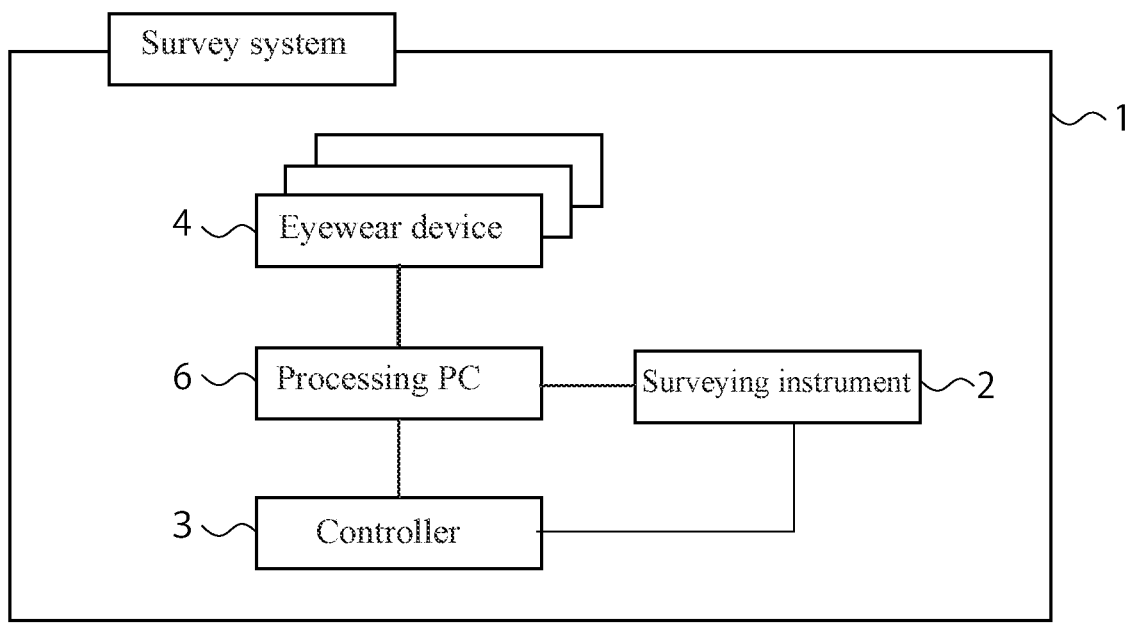
FIG. 2 is a configuration block diagram of the same survey system.

FIG. 2 is a configuration block diagram of the survey system 1. In the survey system 1, the eyewear device 4, the surveying instrument 2, and the controller 3 are wirelessly connected (can also be connected by wire) to the processing PC 6. The controller 3 is a remote operation device for the surveying instrument 2, and is configured to transmit commands wirelessly to the surveying instrument 2 from a remote location. The controller 3 may also be configured to transmit and receive information to and from the surveying instrument 2 through the processing PC 6. In the present embodiment, the number of workers is assumed to be one, however, the number of eyewear devices 4 is not particularly limited, and may be one or plural in number. When a plurality of eyewear devices 4 are used, the respective eyewear devices 4 are configured to be distinguishable by their unique IDs, etc.

Surveying Instrument 2

Figure 3:
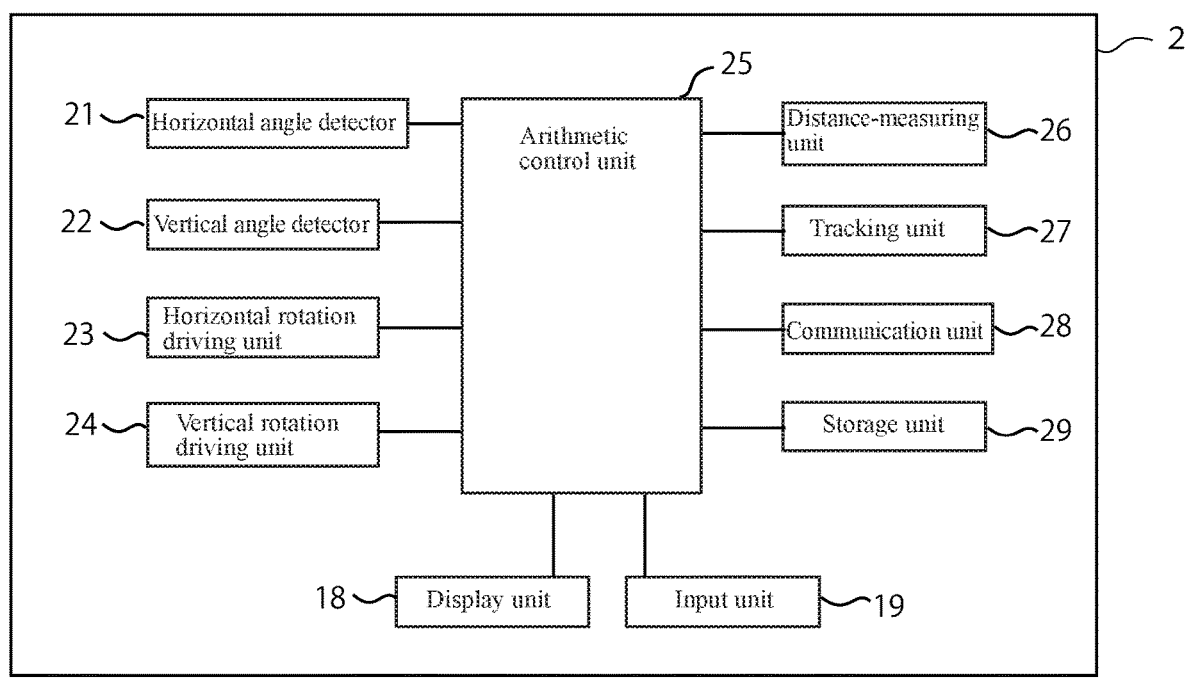
FIG. 3 is a configuration block diagram of a surveying instrument related to the same survey system.

FIG. 3 is a configuration block diagram of the surveying instrument 2. The surveying instrument 2 is a motor-driven total station, and includes a horizontal angle detector 21, a vertical angle detector 22, a horizontal rotation driving unit 23, a vertical rotation driving unit 24, an arithmetic control unit 25, a distance-measuring unit 26, a tracking unit 27, a communication unit 28, a storage unit 29, a display unit 18, and an input unit 19.

The horizontal angle detector 21 and the vertical angle detector 22 are encoders. The horizontal angle detector 21 is provided on a rotation shaft of the bracket portion 2b, and detects a horizontal angle of the bracket portion 2b. The vertical angle detector 22 is provided on a rotation shaft of the telescope 2c, and detects a vertical angle of the telescope 2c.

The horizontal rotation driving unit 23 and the vertical rotation driving unit 24 are motors. The horizontal rotation driving unit 23 drives the rotation shaft of the bracket portion 2b, and the vertical rotation driving unit 24 drives the rotation shaft of the telescope 2c. By collaboration of both driving units, the orientation of the telescope 2c is changed. The horizontal angle detector 21 and the vertical angle detector 22 constitute an angle-measuring unit. The horizontal rotation driving unit 23 and the vertical rotation driving unit 24 constitute a driving unit.

The distance-measuring unit 26 includes a light transmitting unit and a light receiving unit, and outputs distance-measuring light, for example, infrared pulsed laser, etc., from the light transmitting unit, receives reflected light of the distance-measuring light by the light receiving unit, and measures a distance from a phase difference between the distance-measuring light and internal reference light. The distance-measuring unit can make not only a prism measurement but also a non-prism measurement.

The tracking unit 27 includes a tracking light transmitting system that outputs, as tracking light, infrared laser, etc., of a wavelength different from that of the distance-measuring light, and a tracking light receiving system including an image sensor such as a CCD sensor or CMOS sensor. The tracking unit 27 acquires a landscape image including the tracking light and a landscape image excluding the tracking light, and transmits both images to the arithmetic control unit 25. The arithmetic control unit 25 obtains a center of a target image from a difference between the images, detects a position where a deviation between a center of the target image and a visual axis center of the telescope 2c falls within a certain value as a position of the target, and performs automatic tracking to cause the telescope 2c to always face the target.

The communication unit 28 enables communication with an external network, and for example, connects to the Internet by using an internet protocol (TCP/IP) and transmits and receives information to and from the processing PC 6 and the controller 3. The wireless communication is not limited to this, and known wireless communication can be used. Measurement results (distance and angle measurements) made by the surveying instrument 2 are transmitted to the processing PC 6 through the communication unit 28.

The arithmetic control unit 25 is a microcontroller including a CPU, and performs, as controls, information transmission and reception through the communication unit 28, driving of the respective rotation shafts by the horizontal rotation driving unit 23 and the vertical rotation driving unit 24, a distance measurement by the distance-measuring unit 26, angle measurements by the horizontal angle detector 21 and the vertical angle detector 22, and automatic tracking by the tracking unit 27.

The storage unit 29 includes a ROM and a RAM. In the ROM, programs for the arithmetic control unit 25 are stored, and the respective controls are performed in the RAM.

The display unit 18 and the input unit 19 are interfaces of the surveying instrument 2. The input unit includes a power key, numeric keys, and an execution key, etc., and with the input unit, a worker can operate the surveying instrument 2 and input information into the surveying instrument 2. In the present embodiment, commands of a surveying work and result confirmation can also be performed with the processing PC 6 through the communication unit 28. In addition, commands for the surveying instrument 2 can also be issued from the controller 3.

Controller 3

Figure 4A:
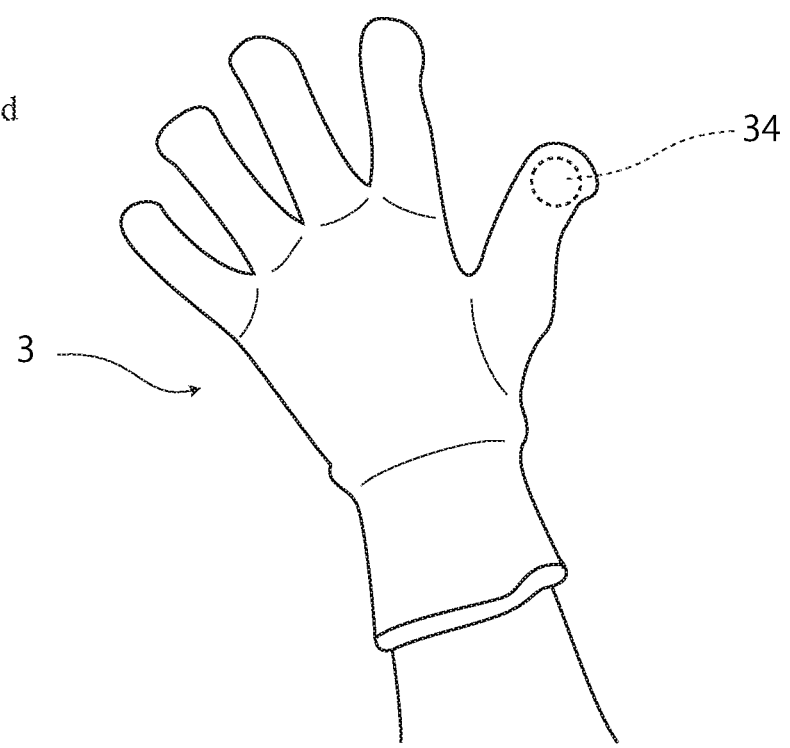
FIGS. 4A and 4B are external views of a controller, illustrating a state where the controller is worn by a worker.
Figure 4B:
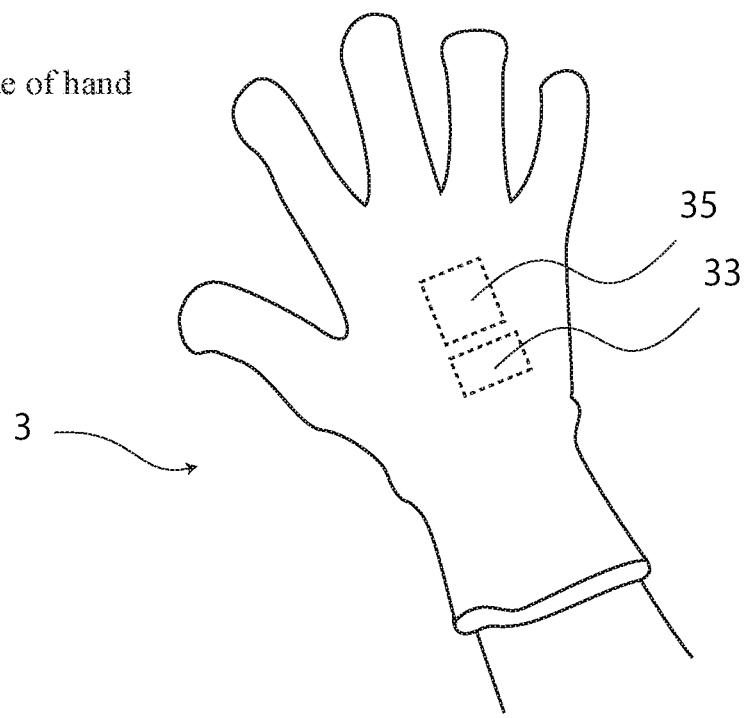
Figure 5:
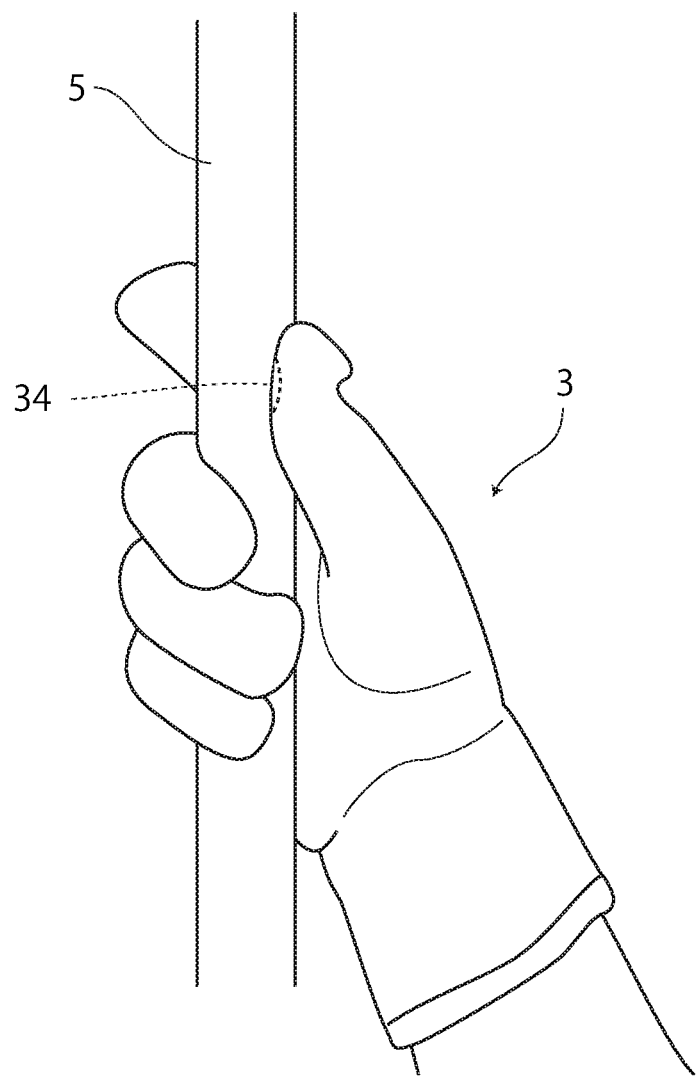
FIG. 5 illustrates an example of a usage state of the controller, and illustrates a state where a worker wears the controller (glove) and grips a pole.
Figure 6:
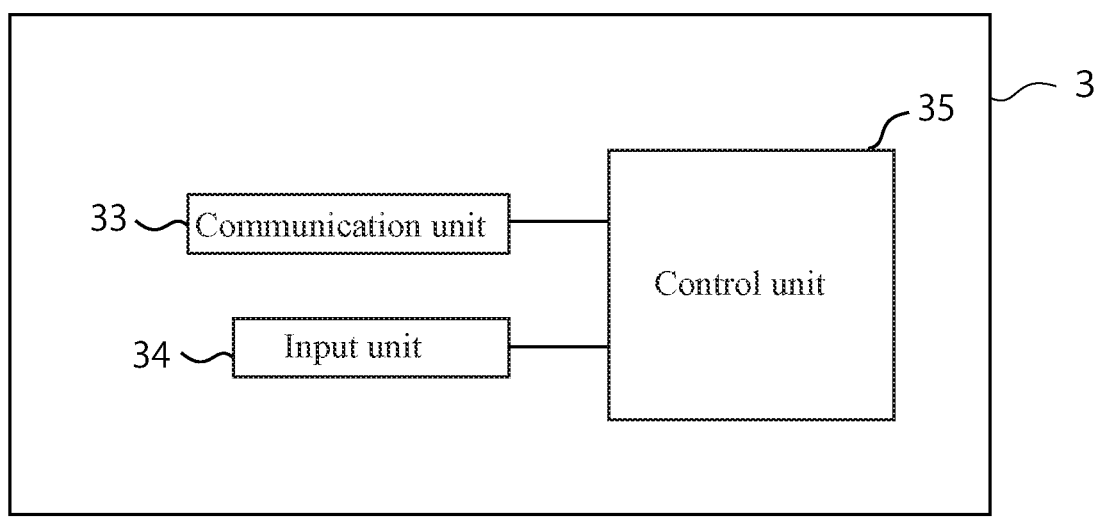
FIG. 6 is a configuration block diagram of the controller.

FIGS. 4A and 4B are external views of the controller 3. FIGS. 4A and 4B illustrate a state where the controller 3 is worn by a worker. FIG. 5 illustrates a usage state of the controller 3, and illustrates a state where the worker wears the controller 3 and grips the pole 5. FIG. 6 is a configuration block diagram of the controller 3.

The controller 3 is a glove-shaped wearable device, and is worn on one hand (preferably, a worker's dominant hand) of a worker. The controller is entirely made of a fiber cloth or a fiber sheet made of a resin with flexibility, and as with a conventional glove, the worker can freely move the hand while wearing the controller.

The controller 3 is a remote operation device for the surveying instrument 2, and is provided with a communication unit 33 and a control unit 35 on a portion covering the back of the hand. An input unit 34 is provided on a fingertip portion of the glove, that is, in the present embodiment, on the pad portion of the thumb serving as a fingerprint portion of the thumb.

The communication unit 33 has a configuration equivalent to the configuration of the communication unit 28, and can transmit and receive information to and from the surveying instrument 2 and the processing PC 6. The communication unit 33 may transmit and receive information to and from the eyewear device 4.

The input unit 34 of the present embodiment is a contact type sensor, and a plurality of commands can be input according to movement of a contacted object, a contact time, a contact pressure, and a contact direction. For example, the input unit 34 is a touch sensor having a predetermined area, and is configured so that a gap is left between two electrode films to prevent contact between them, and when a contacted object presses the touch sensor and causes the electrode films to come into contact with each other, electricity is conducted, and an electrified location is detected. By detection of physical contact, a contact position, a contact position change direction, and a contact time can be detected.

As illustrated in FIG. 5, a worker grips the pole 5 with a hand wearing the controller 3, and uses the controller 3 while gripping the pole 5 in a state where the worker fixes the input unit 34 by pressing it against the pole 5. The worker can input a plurality of commands according to detection patterns. For example, by moving the thumb portion of the input unit 34 by lightly snapping the thumb portion so that it flicks while being in contact with the pole 5, the worker can select a command according to a direction of the movement. The worker can also input a determination when the worker further comparatively strongly presses the thumb portion against the pole 5 for a predetermined time (about 2 seconds) or longer, and by lightly pressing the thumb portion twice, the worker can input a cancellation. Input commands are transmitted to the surveying instrument 2.

The input unit 34 is not limited to this, and may be press sensors (pressure sensors) arranged in a cross form or parallel to each other, and configured to enable inputs of selection/determination/cancellation with the plurality of sensors. The worker wears the glove and can input various commands from the input unit 34 while gripping the pole 5 by pressing of a pad center/right side/left side/fingertip portion of the thumb against the pole 5 that the worker grips, a pressing pressure, and a pressing time, etc. A physical switch such as a push switch may be used.

The control unit 35 is a microcomputer configured by mounting at least a CPU and a memory (RAM, ROM) on an integrated circuit. The control unit 35 outputs information input with the input unit 34 to the processing PC 6 or the surveying instrument 2 through the communication unit 33.

The controller 3 is a double-layered glove having an outer layer and an inner layer, and in the inside of a bag portion, devices and wires not illustrated are provided, and the devices are not exposed to the outside or the inside. Therefore, the glove is reversible so that it can be used even when reversed, and is wearable on both of the left hand and the right hand. Regardless of which hand a dominant hand of a user is, the user can wear and use the controller 3 without a sense of discomfort. A configuration using a controller 3 for the right/left hand including an input unit 34 exposed to the surface may also be used.

Since the controller 3 has a glove shape to be worn on a hand, while a worker grips the pole 5 with at least pads of several fingers and the palm of one hand, the worker can perform a command operation with the remaining finger (in the present embodiment, the thumb). Accordingly, when the worker holds the pole 5 and determines a measurement point Y, the worker can send a command to make measurements (distance and angle measurements) to the surveying instrument 2 without changing the posture. The pole 5 is prevented from being tilted by a worker's action to send a command to the surveying instrument 2. The worker can perform a series of actions while gripping the pole 5 with both hands without removing his/her gaze. The worker can wear the controller 3 on a dominant hand, and this is convenient for use. While gripping the pole 5 with both hands, the worker can perform positioning without fail and directly input commands, so that the pole 5 can be prevented from tilting. Actions which are inherently not related to the survey are omitted, and the surveying process can be efficiently performed in a manner that can shorten the time and is user-friendly.

Eyewear Device 4

Figure 7:
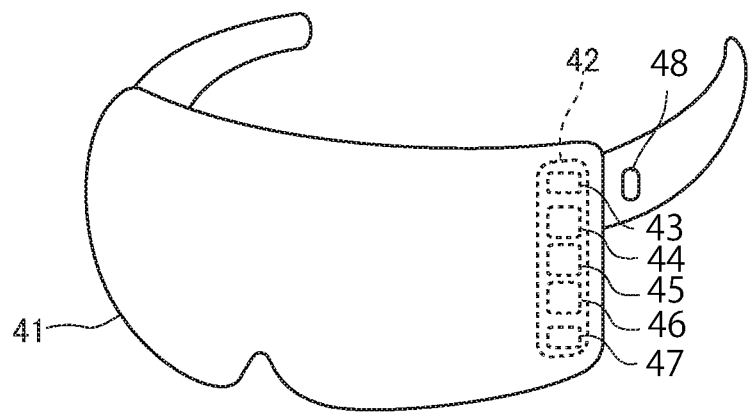
FIG. 7 is an external perspective view of an eyewear device.
Figure 8:
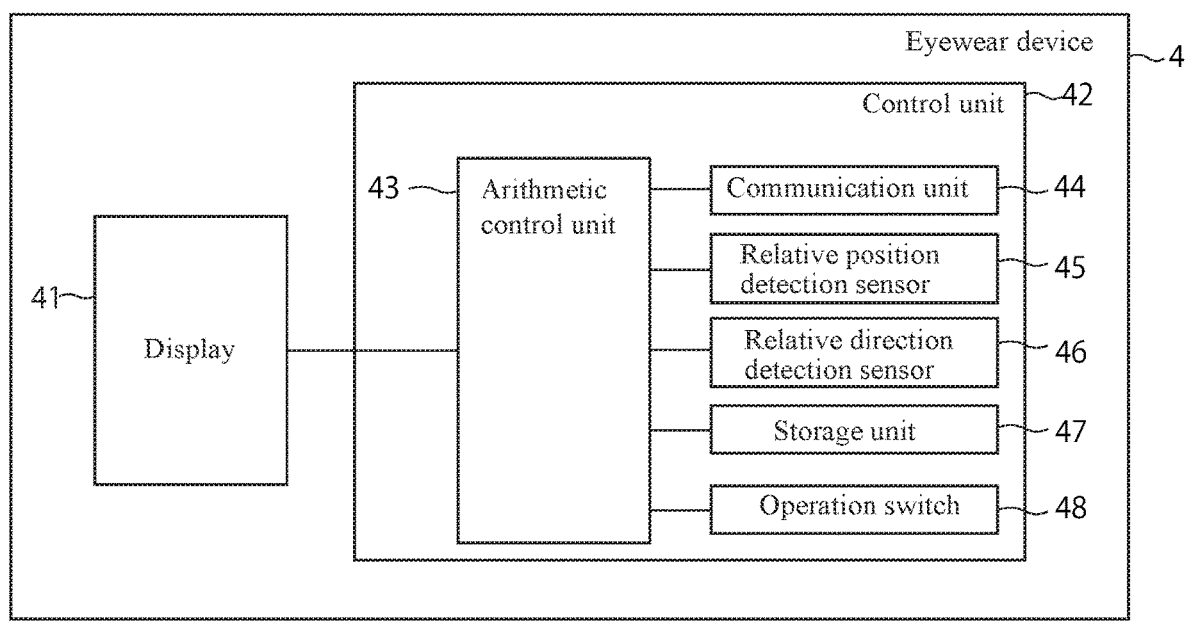
FIG. 8 is a configuration block diagram of the same eyewear device.

FIG. 7 is an external perspective view of the eyewear device 4. FIG. 8 is a configuration block diagram of the eyewear device 4.

The eyewear device 4 is a wearable device to be worn on the head of a worker, and includes a display 41, a control unit 42, an arithmetic control unit 43, a communication unit 44, a relative position detection sensor 45, a relative direction detection sensor 46, a storage unit 47, and an operation switch 48.

The display 41 is a goggles-lens-shaped transmissive display that covers the eyes of a worker when the worker wears it. As an example, the display 41 is an optical see-through display using a half mirror, and is configured to enable observation of a video image obtained by superimposing and synthesizing a virtual image received by the control unit 42 on a real image of a landscape of the site (hereinafter, referred to as "actual landscape").

The communication unit 44 has a configuration equivalent to the configuration of the communication unit described above, and transmits and receives information to and from the surveying instrument 2 and the processing PC 6.

The relative position detection sensor 45 performs wireless positioning from a GPS antenna, a Wi-Fi (registered trademark) access point, and an ultrasonic oscillator, etc., installed at the survey site, to detect a position of the eyewear device 4 at the survey site.

The relative direction detection sensor 46 consists of a combination of a triaxial accelerometer or a gyro sensor and a tilt sensor. The relative direction detection sensor 46 detects a tilt of the eyewear device 4 by setting the up-down direction as a Z axis, the left-right direction as a Y axis, and the front-rear direction as an X axis.

The storage unit 47 is, for example, a memory card. The storage unit 47 stores programs for the arithmetic control unit 43 of the eyewear device 4 to execute functions. The operation switch 48 is, for example, a power button for turning ON/OFF a power supply of the eyewear device 4.

The control unit 42 is a microcomputer configured by mounting at least a CPU and a memory (RAM, ROM) on an integrated circuit. The arithmetic control unit 43 outputs information on a position and a direction of the eyewear device 4 detected by the relative position detection sensor 45 and the relative direction detection sensor 46 to the processing PC 6 through the communication unit 44. In addition, the arithmetic control unit 43 receives position data of the measurement points Y from the processing PC 6 and superimposes and displays the position data on the landscape of the site on the display 41.

Processing PC 6

Figure 9:
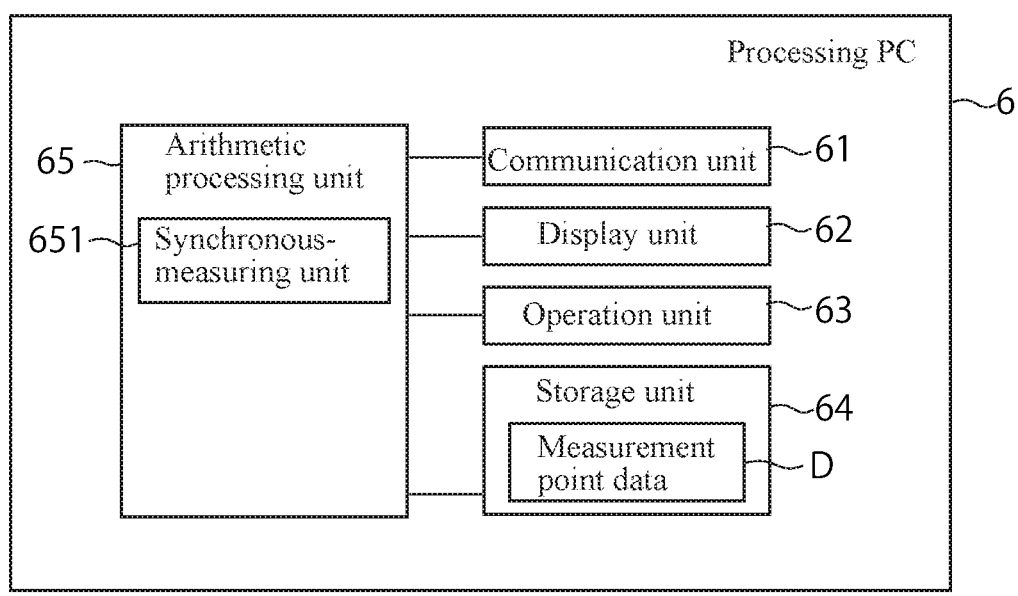
FIG. 9 is a configuration block diagram of a processing PC.

FIG. 9 is a configuration block diagram of the processing PC 6. The processing PC 6 is a general-purpose personal computer, a dedicated hardware using a PLD (Programmable Logic Device), etc., a tablet terminal, or a smartphone, etc. The processing PC 6 includes a communication unit 61, a display unit 62, an operation unit 63, a storage unit 64, and an arithmetic processing unit 65.

The communication unit 61 has a structure equivalent to the structure of the communication unit described above, and transmits and receives information to and from the surveying instrument 2 and the eyewear device 4.

The display unit 62 is, for example, a liquid crystal display. The operation unit 63 is a keyboard, a mouse, etc., and enables various inputs, selections, and determinations.

The storage unit 64 is, for example, an HDD drive. The storage unit 64 stores information on a survey site, including at least measurement point data D as coordinate data of measurement points Y (Y1, Y2, Y3 . . . ) to be measured at the survey site.

The arithmetic processing unit 65 is a control unit configured by mounting at least a CPU and a memory (RAM, ROM, etc.) on an integrated circuit. In the arithmetic processing unit 65, a synchronous-measuring unit 651 is configured software-wise.

The synchronous-measuring unit 651 receives information on a position and a direction of the surveying instrument 2 and information on a position and a direction of the eyewear device 4, and converts the information so that a coordinate space of the surveying instrument 2, a coordinate space of the measurement point data D, and a coordinate space of the eyewear device 4 match each other, and transmits the information to the eyewear device 4.

Hereinafter, an operation to match coordinate spaces of information on positions and directions in devices or data having different coordinate spaces, and manage relative positions and relative directions related to the respective devices in a space with an origin set at a common reference point, is referred to as synchronization.

Measuring Method

Figure 10:
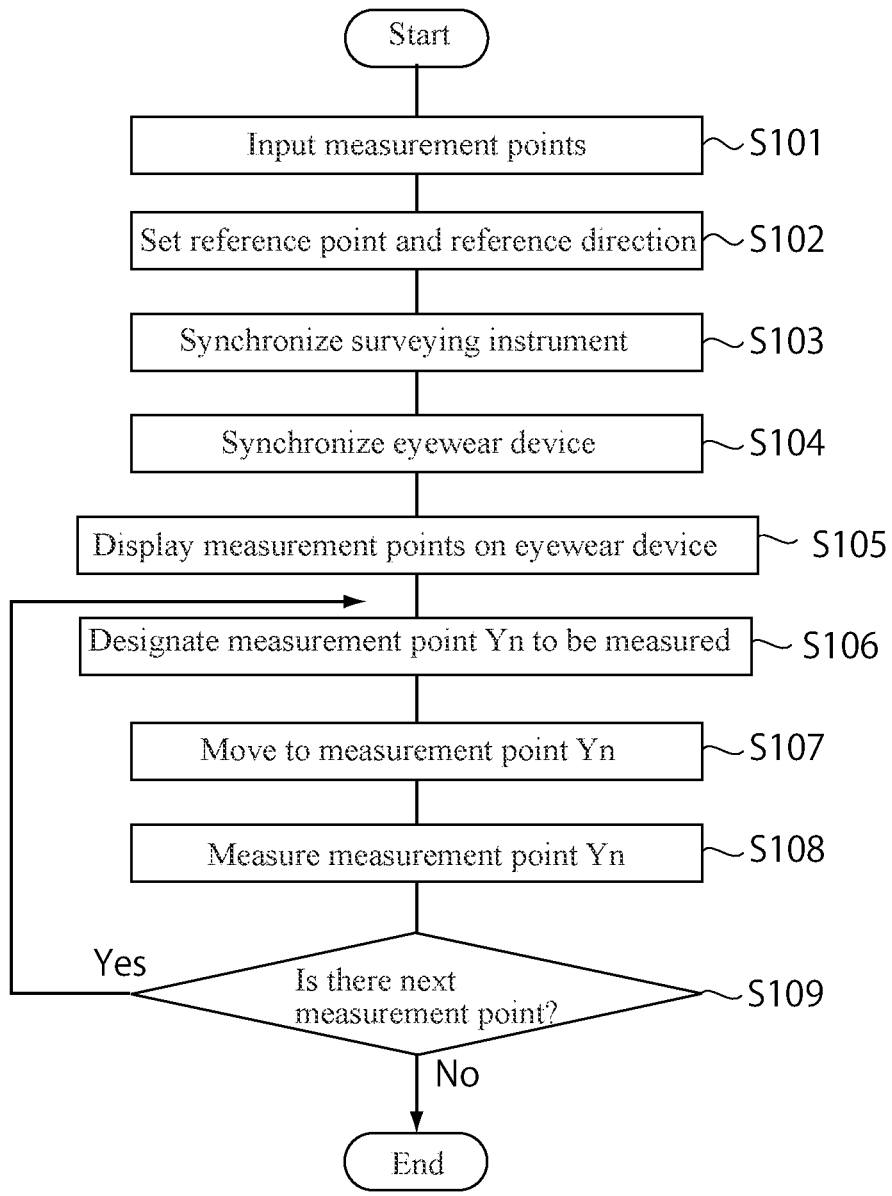
FIG. 10 is a process flowchart of the survey system.
Figure 11:
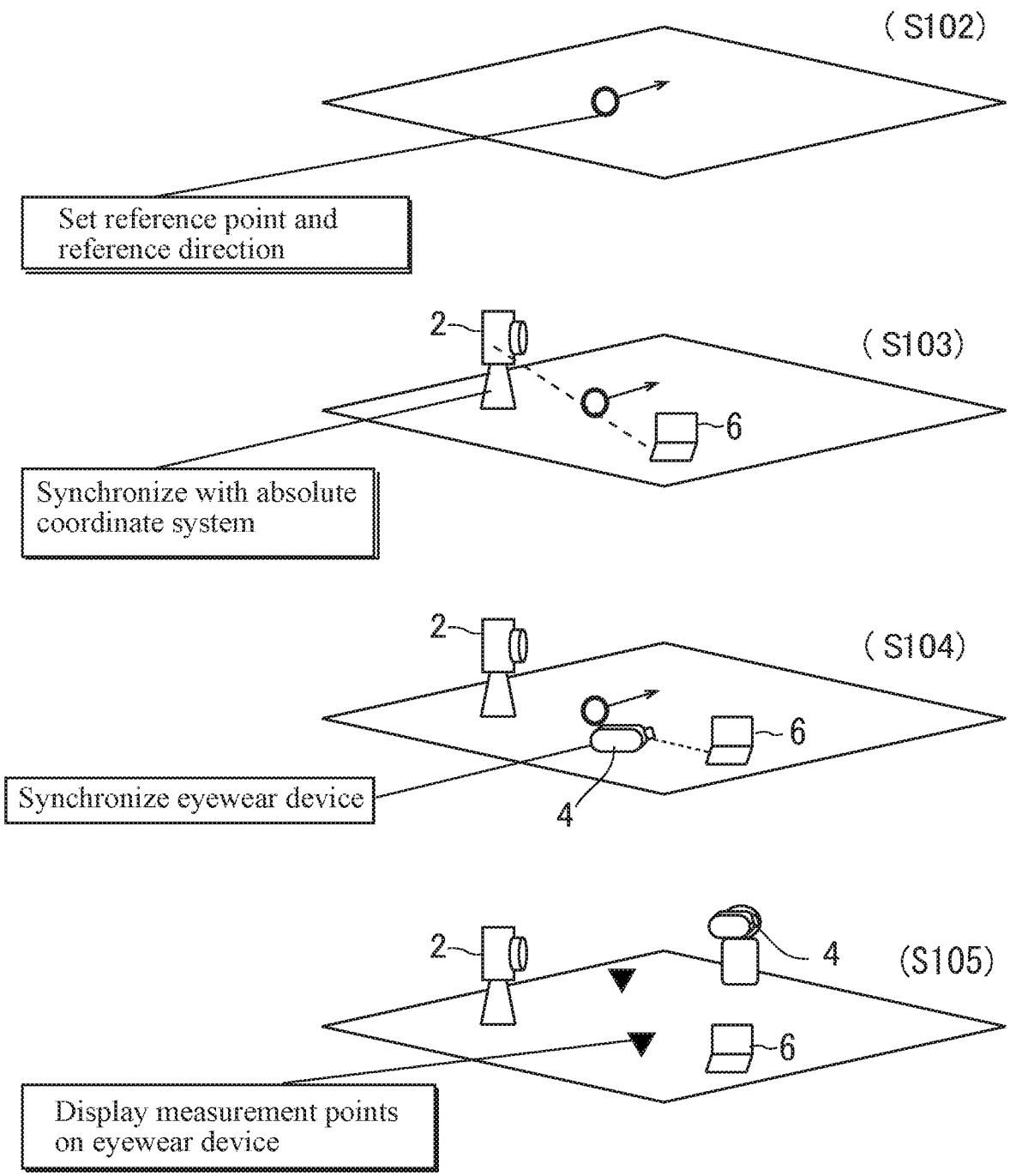
FIG. 11 is a drawing describing initial settings (steps S102 to S105) in the same process flow.

Next, an example of use of the survey system 1 (staking work) will be described. FIG. 10 illustrates a process flow of the work using the survey system 1. FIG. 11 is a work image view of Steps S102 to S105. FIG. 12 and FIGS. 13A, 13B, and 13C illustrate examples of images viewed from the eyewear device 4 according to the survey system 1.

First, in Step S101, as pre-processing, a worker inputs information on a survey site including CAD data and measurement point data D for staking into the processing PC 6. The input information is stored in the storage unit 64 of the processing PC 6.

Next, the processing shifts to Step S102, and the worker sets a reference point and a reference direction at the survey site. As the reference point, an arbitrary point within the site such as prescribed coordinates is selected. As the reference direction, a direction from a reference point to a characteristic point is set after arbitrarily selecting the characteristic point different from the reference point.

Next, the processing shifts to Step S103, and the worker synchronizes the surveying instrument 2. Specifically, the worker installs the surveying instrument 2 at the reference point at the site, and grasps absolute coordinates of the surveying instrument 2 by observation of backward intersection, etc., including the reference point and the characteristic point. The surveying instrument 2 transmits the coordinate information to the processing PC 6. The synchronous-measuring unit 651 of the processing PC 6 converts absolute coordinates of the reference point into (x, y, z)=(0, 0, 0), and recognizes the reference direction as a horizontal angle of 0 degrees, and thereafter, concerning information from the surveying instrument 2, manages a relative position and a relative direction of the surveying instrument 2 in a space with an origin set at the reference point.

Next, the processing shifts to Step S104, and the worker synchronizes the eyewear device 4. Specifically, the worker installs the eyewear device 4 at the reference point, matches a center of the display 41 with the reference direction, and sets (x, y, z) of the relative position detection sensor 45 to (0, 0, 0) and sets (roll, pitch, yaw) of the relative direction detection sensor 46 to (0, 0, 0). Thereafter, concerning data acquired from the eyewear device 4, the synchronous-measuring unit 651 of the processing PC 6 manages a relative position and a relative direction of the eyewear device 4 in the space with an origin set at the reference point. As a result, a relative position and a relative direction of the eyewear device 4 are also managed in the space with an origin set at the reference point.

Synchronization of the eyewear device 4 is not limited to the method described above, and may be performed, for example, in such a manner that the eyewear device 4 is provided with a laser device for indicating a center and a directional axis of the eyewear device 4, and by using a laser as a guide, the center and the directional axis are matched with the reference point and the reference direction.

Alternatively, it is also possible that a storing position for the eyewear device 4 is provided in the surveying instrument 2, and a relative relationship between the eyewear device 4 and the surveying instrument 2 is determined in advance, and by starting synchronization in a state where the eyewear device 4 is stored in the storing position of the surveying instrument 2, they are synchronized based on the relative relationship.

Next, the processing shifts to Step S105, and the synchronized measurement point data D is displayed on the display 41 of the eyewear device 4. When the worker wears the eyewear device 4 and views the inside of the survey site, a relative position and a relative direction of the eyewear device 4 to the actual landscape are managed by the processing PC 6, so that from the processing PC 6, the measurement point data D synchronized with the actual landscape (real image of a landscape viewed through the display 41) is displayed as a virtual image on the eyewear device 4.

Figure 12:
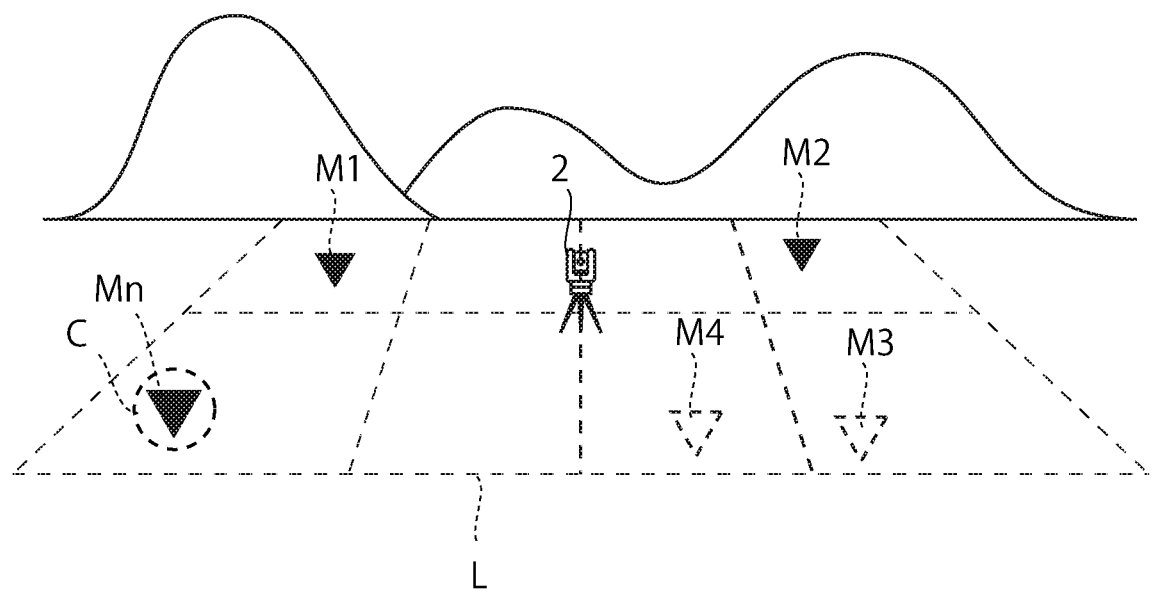
FIG. 12 illustrates an example of an image that a worker visually recognizes through the eyewear device.

FIG. 12 illustrates an example of display viewed through the display 41 by the worker wearing the eyewear device 4. The actual landscape is illustrated with solid lines, and the virtual image is illustrated with dashed lines. As illustrated in FIG. 12, the worker wearing the eyewear device 4 can confirm the measurement points Y superimposed on the actual landscape. That is, the measurement points Y (Y1, Y2, Y3 . . . ) are synchronized and displayed so as to be visually recognized as inverted triangular marks M (M1, M2, M3 . . . ) of virtual images at corresponding positions in accordance with the site. Lines L are displayed in a matrix at intervals of a predetermined distance from an arbitrary point (installation point of the surveying instrument 2 in FIG. 12). The inverted triangular marks (M1, M2, M3 . . . ) are preferably recognizably displayed in such a manner that an unmeasured point and a measured point are distinguished by being colored in different colors, and the longer the distance from the worker (eyewear device 4) is, the smaller the displayed mark is.

Next, the processing shifts to Step S106, and a measurement point Yn (staking point) to be measured next is determined. The worker wears the controller 3 on his/her dominant hand and grips the pole 5, and among inverted triangular marks M (M1, M2, M3 . . . ) displayed as measurement points Y (Y1, Y2, Y3 . . . ) on the display 41, selects and determines one inverted triangular mark Mn as a next measurement point Yn with the input unit 34. Marks are displayed in a recognizable way such that, for example, the selected inverted triangular mark Mn flashes on the display 41, and after it is determined as a next measurement point Yn, this inverted triangular mark Mn is circled by a circle C. The surveying instrument 2 directs the telescope 2c toward the determined measurement point Yn.

Next, the processing shifts to Step S107, and while gripping the pole 5, the worker moves to the measurement point Yn to be measured. When the target 7 approaches a predetermined range (approximately 1 m) from the measurement point Yn, the target 7 is locked on to by the surveying instrument 2, and the tracking unit 27 starts automatic tracking. FIG. 13A illustrates a virtual image added to the display 41 when the target 7 is locked on to. FIGS. 13A, 13B, and 13C illustrate images all of which are virtual images to be displayed on the display 41, and are illustrated with solid lines. As detailed position information of the target 7, a detailed image R1 illustrating a distance and a direction to the measurement point Yn is displayed on the display 41. During tracking, data is transmitted as needed, and a position of the target 7 is displayed in real time on the display 41.

Without limitation to the above and depending on the situation, images may also be displayed on the display 41 for necessary information and commands that can be input. FIG. 13B illustrates, as an example, added images during tracking. Images are displayed by using only characters, such as an image R21 of "Measure" that commands the surveying instrument 2 to make distance and angle measurements, an image R22 of "Re-track" in the case where lock on the target 7 is released, and an image R23 of "Menu" for transition to a menu image. A selected command is displayed recognizably to the worker by highlighting, etc.

Images R3 illustrated in FIG. 13C are examples of menu content, and indicate control devices to be connected, and are displayed as icons on the display 41. For example, an image R31 indicates a small-sized control device to be attached to the pole 5. With this device, only inputs can be made, and because of the small size, a worker can input commands while gripping the pole 5. An image R32 indicates a controller 3 as a glove-shaped control device. An image R33 indicates an eye sensor that is added as an option to the eyewear device 4, and a command can be input according to motion of an eye. An image R34 indicates a control device configured as a separate body such as a smartphone or dedicated terminal. This device includes a display and a switch, and inputs can be made from the switch.

In addition to the controller 3, the survey system 1 can include one or more devices (control devices) capable of inputting commands, and can be simultaneously connected to a plurality of devices, and commands can be input from any one of the connected devices. In the present embodiment, the controller 3 is connected as a control device of the surveying instrument 2, and the image R32 is highlighted to indicate the connection. By configuring the survey system 1 to allow the surveying instrument 2 to be connected to a plurality of control devices, a comfortable work environment can be established according to the skill level of the worker and compatibility with the device.

Next, the processing shifts to Step S108, and the worker grasps a detailed position based on the image R1 displayed on the display 41, and erects the pole 5 substantially vertically on the measurement point Yn. When the worker sends a command to start measurements to the surveying instrument 2 by lightly pressing the input unit 34 on the thumb portion against the pole 5 for several seconds without changing his/her posture, the surveying instrument 2 starts distance and angle measurements, and measurement results are transmitted to the processing PC 6.

Next, when the measurements of the measurement point are completed in Step S109, measurement data are transmitted to the processing PC 6, and for selecting a measurement point Yn to be measured next, the processing shifts to Step S106, and Steps S106 to S109 are repeated until measurements of all measurement points Y are completed. After measurements of all measurement points Y are completed, the processing ends.

Operation and Effect

As described above, according to the survey system 1, measurement points Y (Y1, Y2, Y3 . . . ) are displayed on the eyewear device 4, and a worker can grasp the positions superimposed on an actual landscape. The worker can also input commands just with a fingertip without changing his/her posture holding the pole 5. Wasteful action is omitted, and accordingly, a survey by a worker alone is improved in efficiency. Unlike the conventional case, the worker does not have to carry a device including a display, turn his/her gaze to the display to perform a device operation, move a hand to make inputs, and support the pole with one hand. Commands and instructions from the input unit 34 are executed without fail. The worker can seamlessly perform a series of work for a survey alone, and the work efficiency is improved.

Figure 14:
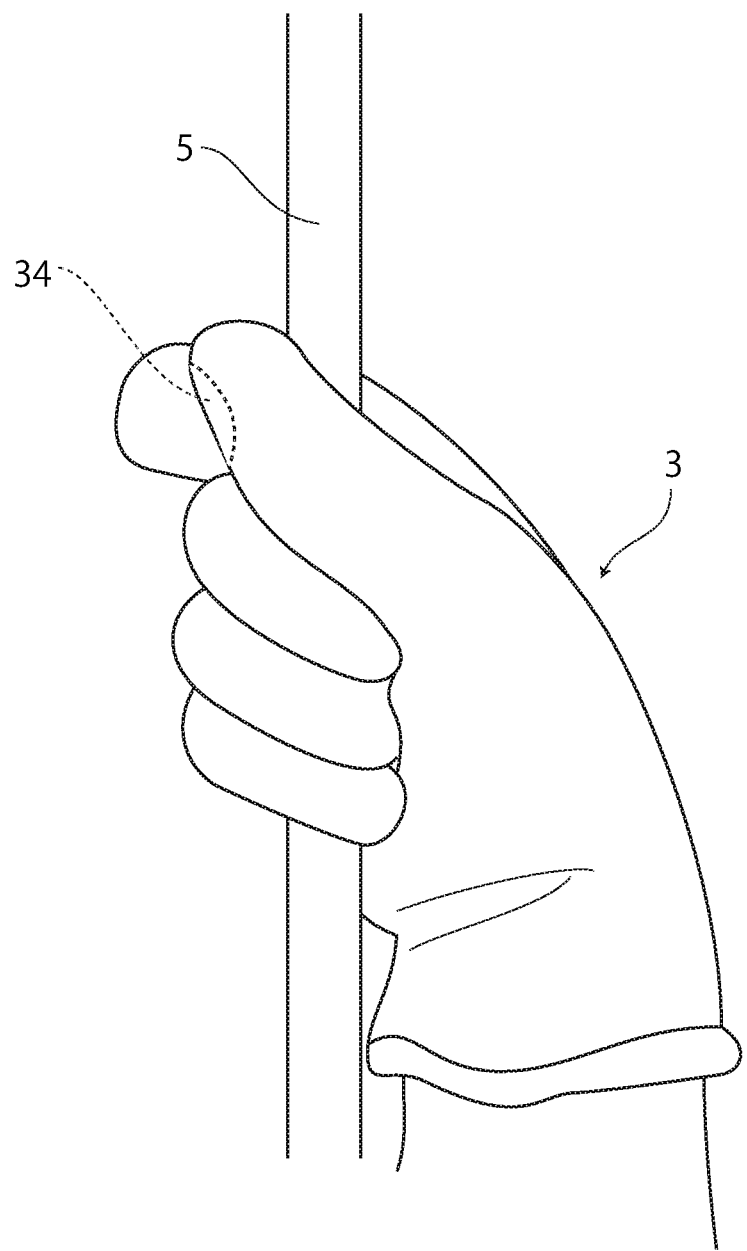
FIG. 14 illustrates another example of a usage state of the controller.

FIG. 14 illustrates another usage state of the controller 3. When the pole 5 is thin or low, or when the worker's hand is large, the worker can input commands from the input unit 34 by causing the thumb portion and the index finger portion of the glove to contact each other. In this way, a contacted object that the input unit 34 detects is not limited to the pole 5, and may be, for example, the index finger portion or the middle finger portion of the glove. The worker can input commands from the input unit 34 by using motion of the thumb according to the situation.

A configuration in which the controller 3 is provided with a speaker or a light emitting unit (LED) to produce sounds or light according to an operation enables the worker to confirm inputs, and is preferable.

Modification 1

Figure 15A:
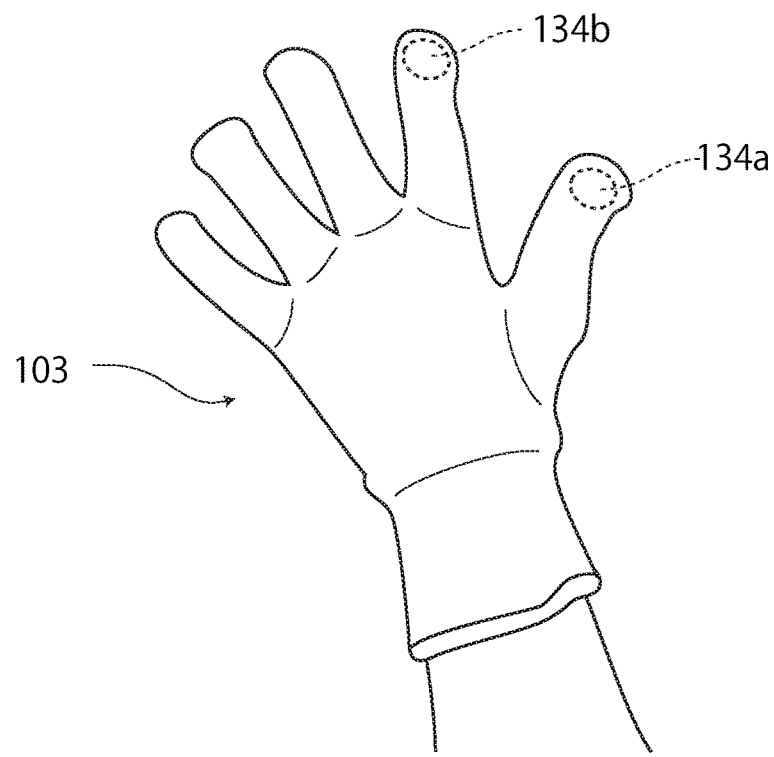
FIGS. 15A and 15B are external views of a modification.
Figure 15B:
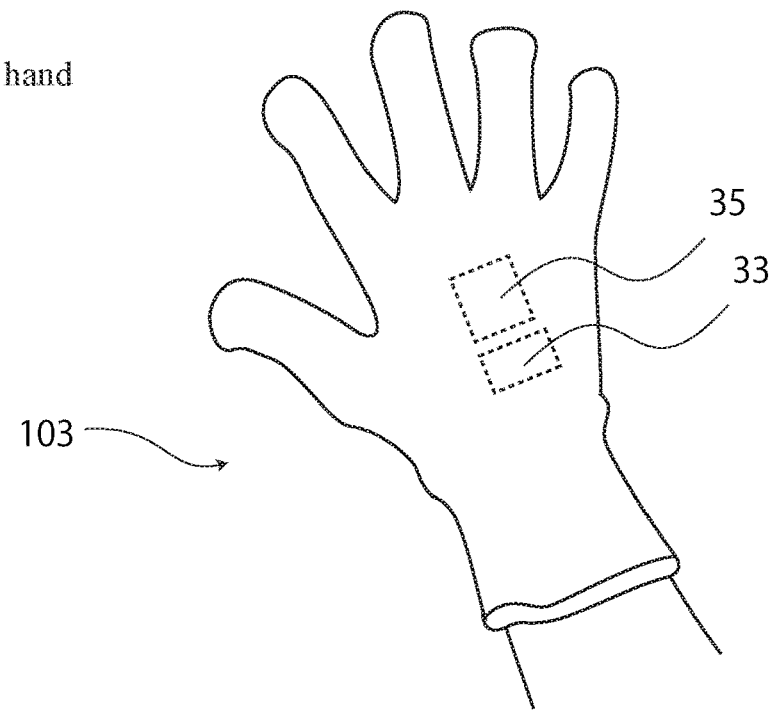
Figure 16:
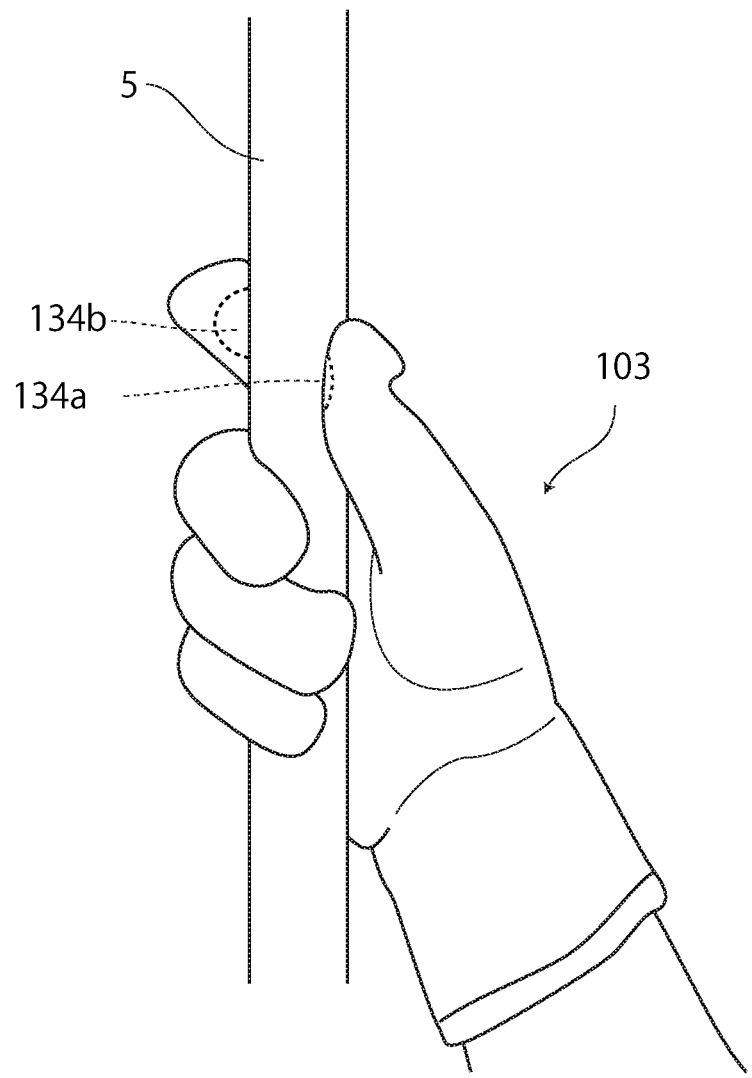
FIG. 16 illustrates a usage state of the modification.

FIGS. 15A and 15B are external perspective views of a controller 103 according to a modification of the embodiment. FIG. 16 illustrates a usage state of the controller 103. Components having the same configuration as the above-described are provided with the same reference signs, and description thereof will be omitted.

The controller 103 has a configuration substantially equivalent to the configuration of the controller 3, and an input unit 134 consists of a first input unit 134a provided on a fingertip portion of the thumb of the glove, and a second input unit 134b provided on a fingertip portion of the index finger. As illustrated in FIG. 16, when using the controller 103, the worker wears the glove as the controller 103 and holds the pole 5 between the thumb portion and the index finger portion while gripping the pole 5. The second input unit 134b of the index finger portion is just a press sensor, and can input only a determination command. The first input unit 134a and the second input unit 134b enable the worker to operate the surveying instrument 2 with the index finger and the thumb, and the operability is improved.

Modification 2

Figure 17A:
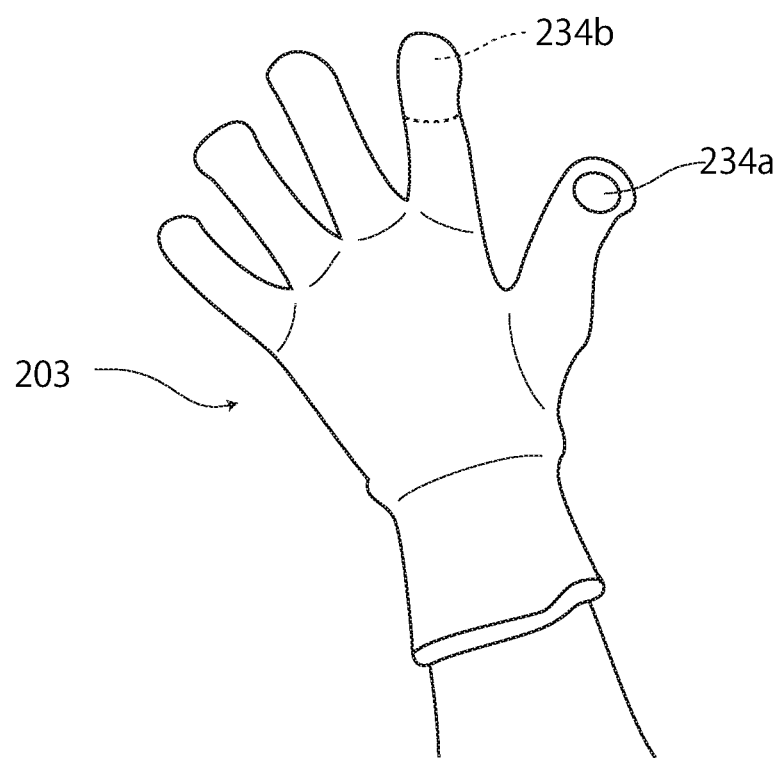
FIGS. 17A and 17B are external views of another modification.
Figure 17B:
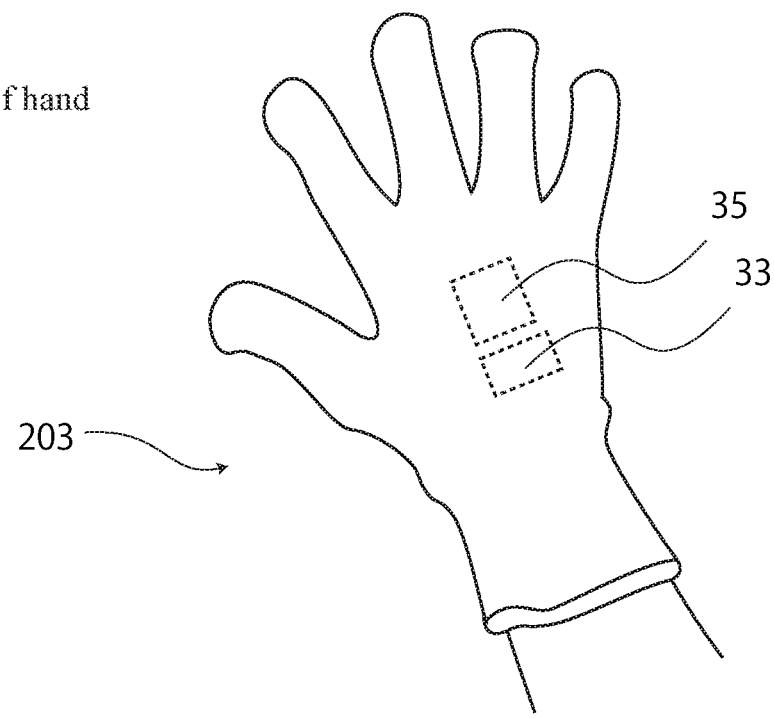
Figure 18:
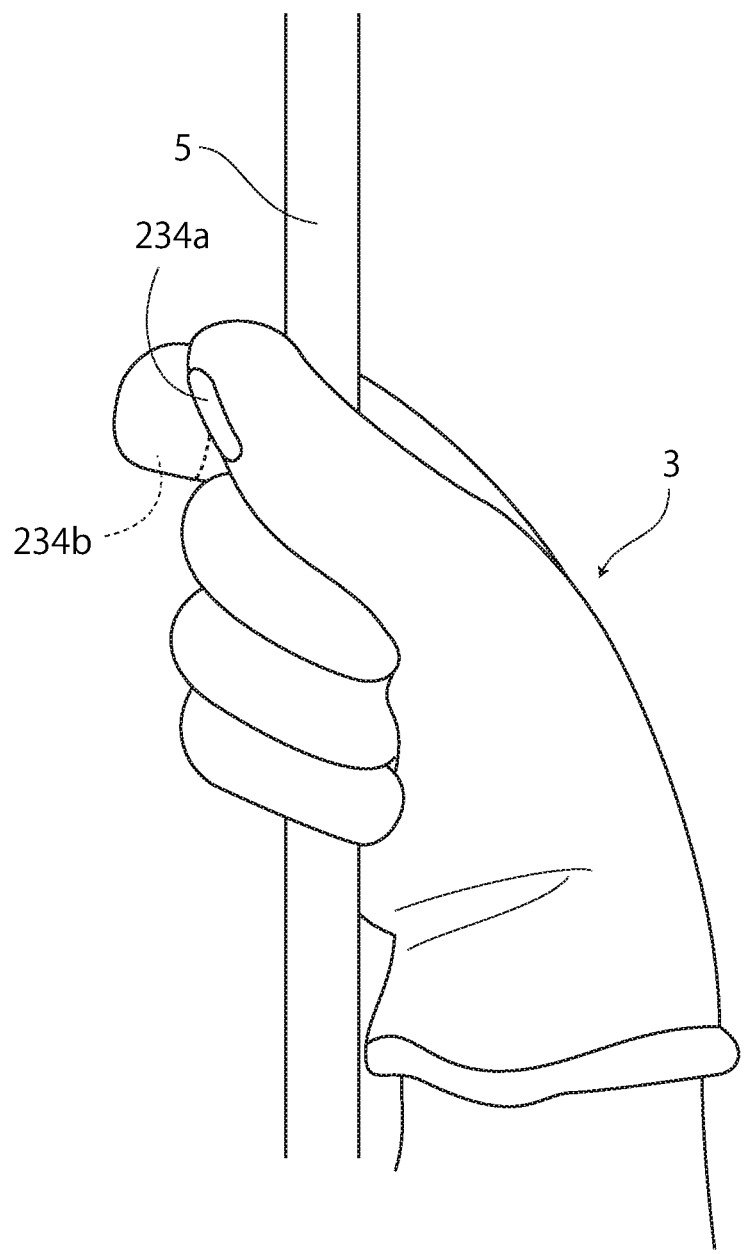
FIG. 18 illustrates a usage state of another modification.

FIGS. 17A and 17B are external perspective views of a controller 203 according to another modification of the embodiment. FIG. 18 illustrates a usage state of the controller 203. Components having the same configuration as the above-described are provided with the same reference signs, and description thereof will be omitted.

The controller 203 has a configuration substantially equivalent to the configuration of the controller 3, and an input unit 234 consists of a first input unit 234a provided on and exposed from a pad portion of the thumb of the glove, and a second input unit 234b provided on a fingertip portion of the index finger. The first input unit 234a is an electrostatic sensor configured by arranging electrodes in a matrix so as not to overlap each other on a film that conducts electricity, and when an electrostatic capacitance changes due to a contact of a conductive object, the sensor detects a contact position. For the second input unit 234b, a conductive member is used, and a command is input when the worker wearing the controller 203 rubs the index finger and the thumb together. A worker can input a plurality of commands with the first input unit 234a and the second input unit 234b that are paired according to patterns of motions of the worker's fingertips. For example, "selection" is input by joining the thumb and the index finger together and flicking them, and "determination" is input by causing the thumb and the index finger to lightly contact each other twice.

The input unit of the glove-shaped controller 3 is not limited to the forms described above, and conventionally known configurations can be used such as an infrared sensor or an ultrasonic sensor.

A preferred embodiment of the present invention has been described above, however, the embodiment described above is just an example of the present invention. For example, the arithmetic processing unit 65 and the storage unit 64 may be included in the surveying instrument 2. Accordingly, the functions of the processing PC 6 can be integrated with the surveying instrument 2, the settings can be easily made, and the surveying instrument 2 can be easily carried and moved. In this way, the embodiment can be modified based on the knowledge of a person skilled in the art.

Such modification and a combination of examples can be made based on the knowledge of a person skilled in the art, and such modification and combination are also included in the scope of the present invention.

REFERENCE SIGNS LIST

1: Survey system
2: Surveying instrument
3: Controller
4: Eyewear device
5: Pole
6: Processing PC
7: Target
19: Input unit
21: Horizontal angle detector
22: Vertical angle detector
23: Horizontal rotation driving unit
24: Vertical rotation driving unit
25: Arithmetic control unit
26: Distance-measuring unit
27: Tracking unit
28: Communication unit
29: Storage unit
33: Communication unit
34: Input unit
41: Display
44: Communication unit
45: Relative position detection sensor
46: Relative direction detection sensor
47: Storage unit
64: Storage unit
65: Arithmetic control unit
651: Synchronous-measuring unit
Y: Measurement point

The invention claimed is:

1. A survey system comprising:
a target; a pole to which the target is attached;
a surveying instrument including a distance-measuring unit configured to measure a distance to the target, an angle-measuring unit configured to measure a vertical angle and a horizontal angle at which the distance-measuring unit faces, a driving unit configured to drive a vertical angle and a horizontal angle of the distance-measuring unit to set angles, a communication unit, and an arithmetic control unit configured to execute input commands, and capable of making distance and angle measurements of the target;

a controller including a communication unit and an input unit for inputting commands, and configured to transmit commands to the surveying instrument by communicating with the surveying instrument;

an eyewear device including a communication unit, a display, a relative position detection sensor configured to detect a position of the device, and a relative direction detection sensor configured to detect a direction of the device;

a storage unit configured to store a measurement point at a survey site; and an arithmetic processing unit including a synchronous-measuring unit configured to receive information on a position and a direction of the eyewear device and synchronize the information with coordinates of the measurement point, wherein the controller is a glove to be worn on a hand and is provided with the input unit on a fingertip portion, and on the display, the measurement point calculated by the arithmetic processing unit is displayed so as to be superimposed on a landscape of the survey site, and distance and angle measurements by the surveying instrument are made according to a command input from the controller.

2. The survey system according to claim 1, wherein the input unit is a sensor provided on at least a fingertip portion of the thumb of the glove to detect a contact, and configured to detect a contact direction, a movement direction of a contacted object, a contact strength, and a contact point, etc., and input a plurality of kinds of commands according to detection patterns.

3. The survey system according to claim 2, wherein the sensor is an electrostatic sensor or a pressure sensor.

4. The survey system according to claim 1, wherein the surveying instrument includes a tracking unit configured to automatically track the target, and is configured so that the target is automatically tracked when the target is within a predetermined range from the measurement point, and position information of the target is displayed in real time on the display.

5. The survey system according to claim 1, wherein the storage unit and the arithmetic processing unit are included in the surveying instrument.

* * * * *